United States Patent [19]

Stol

[11] Patent Number: 4,528,436
[45] Date of Patent: Jul. 9, 1985

[54] HIGH RELIABILITY DOUBLE-CHAMBERED SHIELDING SYSTEM FOR WELDING

[75] Inventor: Israel Stol, Pittsburgh, Pa.

[73] Assignee: Westinghouse Electric Corp., Pittsburgh, Pa.

[21] Appl. No.: 591,360

[22] Filed: Mar. 20, 1984

[51] Int. Cl.³ .............................................. B23K 9/16
[52] U.S. Cl. .................................... 219/74; 219/59.1; 219/61
[58] Field of Search ........................ 219/59.1, 60 R, 61, 219/61.7, 121 LC, 121 LD, 74, 121 FS, 136, 67

[56] References Cited

U.S. PATENT DOCUMENTS

| | | | |
|---|---|---|---|
| 2,611,848 | 9/1952 | Smith | 219/59.1 |
| 2,868,950 | 1/1959 | Gage | 219/74 |
| 2,903,559 | 9/1959 | Wempe | 219/75 |
| 3,652,818 | 3/1972 | Erlandson et al. | 219/74 X |
| 3,875,364 | 4/1975 | Boyett | 219/74 |
| 4,000,392 | 12/1976 | Banas | 219/121 LM |
| 4,278,864 | 7/1981 | De Facci | 219/75 |
| 4,278,868 | 6/1981 | Rudd et al. | 219/123 |

FOREIGN PATENT DOCUMENTS 2504042 10/1982 France .................... 219/74

*Primary Examiner*—Philip H. Leung
*Assistant Examiner*—Catherine M. Sigda
*Attorney, Agent, or Firm*—Douglas E. Erickson

[57] ABSTRACT

An improved system (50) for shielding a circumferential region about elongate workpieces from air contamination during welding or heat treatment includes a pair of generally cylindrical shields (52, 54) which define central openings for receiving the workpieces, and which are positioned in longitudinally spaced apart relationship about the joint or region to be welded or heat treated. The shields (52, 54) are of symmetrical but otherwise identical construction. For example, the shield (52) includes a first annular chamber (70) and associated annular diffuser positioned adjacent the process zone, and a second annular chamber (86) and associated cylindrical diffuser (90) extending away from the zone. The chambers (70, 86) are connected to independent sources of inert gas, which flows both into and out away from the process zone to eliminate air contamination from aspiration and the like. A slotted sleeve (98) is preferably provided over the shields (52, 54) to substantially enclose the circumferential region therebetween.

17 Claims, 7 Drawing Figures

U.S. Patent   Jul. 9, 1985   Sheet 3 of 3   4,528,436

HIGH RELIABILITY DOUBLE-CHAMBERED SHIELDING SYSTEM FOR WELDING

BACKGROUND OF THE INVENTION

The present invention relates generally to an apparatus for shielding a circumferential zone about tubes, pipes, rods or other elongated workpieces during welding or heat treatment. More particularly, this invention concerns an improved gas shielding system for welding which incorporates two chambers, one opening annularly adjacent to and in a direction across the thermal zone and the other opening cylindrically about the workpiece in a direction away from the zone, with each being connected to independently controlled sources of inert gas, to avoid air contamination.

Welding or heat treatment involves application of localized heating to a work piece, or to a joint between adjacent work pieces, sufficient to accomplish the intended result. Such heating typically takes place in the surrounding air, which can be a source of contamination for the region being treated due to the dynamics of the process. Shielding with inert gas is adopted wherever process stability and compositional control of the metal alloys involved are necessary. For example, when arc welding with inert gas is contaminated with air, arc behavior can become erratic and excessive oxidation of the deposit can occur. These can affect the weld deposit's soundness or porosity, geometrical consistency, mechanical properties, and/or corrosion resistance. To effectively prevent either migration and/or aspiration of air to the intensely heated region (e.g. welding, heat treating), shielding of the region in a controllably uniform manner (i.e. with laminar-like flow and even coverage) is desirable.

The importance of shielding to obtain high quality welded or heat treated areas has long been recognized, and various shielding arrangements have been available heretofore. For example, U.S. Pat. No. 2,903,559 to Wempe shows a torch for arc welding with inner and outer concentric nozzles surrounding the electrodes which deliver protective gases about the weld zone to define two protective zones. Similarly, U.S. Pat. No. 2,868,950 to Gage discloses a metal arc welding process and apparatus including two annular gas passages which produce protective gas shields about the welding arc. Both the Wempe and the Gage Patents are thus representative of the prior art approach to shielding, which is to discharge suitable shielding or inert gas through annular passages surrounding the welding nozzle. The more recent U.S. Pat. No. 4,000,392 to Banas relates to a laser welding method wherein a layer of shielding gas is maintained to the weld zone. Each of these patents is illustrated as being particularly applicable to flat workpieces, as opposed to tubular or cylindrical workpieces.

The welding or heat treatment of cylindrical or tubular workpieces, such as sections of tubing or the like, involves some additional factors which complicate the problem of providing effective shielding against air contamination. Precision tubing, like that utilized in nuclear power plants, is typically welded in fixtures wherein the tubing is rotated past a welding nozzle or laser. The high temperature of the welding region near the surface of the tubing causes a decompressed region which tends to draw air toward it. In addition the viscous boundary layer effects associated with the rotating tubing tends to pull air toward the heat source. Air can thus enter the process zone by aspiration, transpiration, and diffusional migration.

Complete enclosure of the tubing, support fixture and welder within a chamber of inert gas is impractical, and the shielding devices of the prior art are neither adapted or suited for high reliability circumferential welding or heat treatment in a compact and efficient manner. The prior devices have suffered from the disadvantages of poor shielding gas economy, low controllability and reliability, and limited interchangability between the various welding processes. In addition, some special metal alloys such as titanium and zirconium are especially sensitive to air contamination during welding, and the prior shielding techniques have been inadequate for use with such alloys.

A need has thus developed for an improved shielding system whereby welding and heat treatment of rotating elongated workpieces such as tubing and the like, can be accomplished in a more compact, efficient, and reliable manner with better results.

SUMMARY OF THE INVENTION

The present invention comprises an improved shielding system for welding and heat treatment which overcomes the foregoing and other difficulties associated with the prior art. In accordance with the invention, there is provided a shielding system which is adapted to approximate a closed chamber surrounding the elongated workpieces which are to be circumferentially welded or heat treated. The system herein includes a pair of generally cylindrically shields which are located in longitudinally and circumferentially spaced apart relationship about the workpieces for access by the welding torch or the like therebetween. Each shield defines two chambers, one chamber having an annular outlet adjoining the process zone defined between the shields, and another chamber having a cylindrical outlet surrounding the workpiece and extending away from the process zone. The outlets of the chambers are covered by gas lenses or diffusers for even distribution. The chambers are connected to independently controlled sources of inert gas and are preferably maintained at positive pressures slightly above atmosphere so that the spaces between the shields and workpiece and continuously flooded with inert gas flowing outwardly so that no air contamination by aspiration, diffusional migration or transpiration can occur. Means are preferably provided within the chambers of each shield to enhance even pressure distribution of the inert gas therein. A slotted sleeve is preferably provided over the shields to approximate a partially closed chamber surrounding the process zone.

BRIEF DESCRIPTION OF THE DRAWINGS

A better understanding of the invention can be had by reference to the following Detailed Description in conjunction with the accompanying Drawings, wherein.

DESCRIPTION OF THE PREFERRED EMBODIMENT

Figure 1:
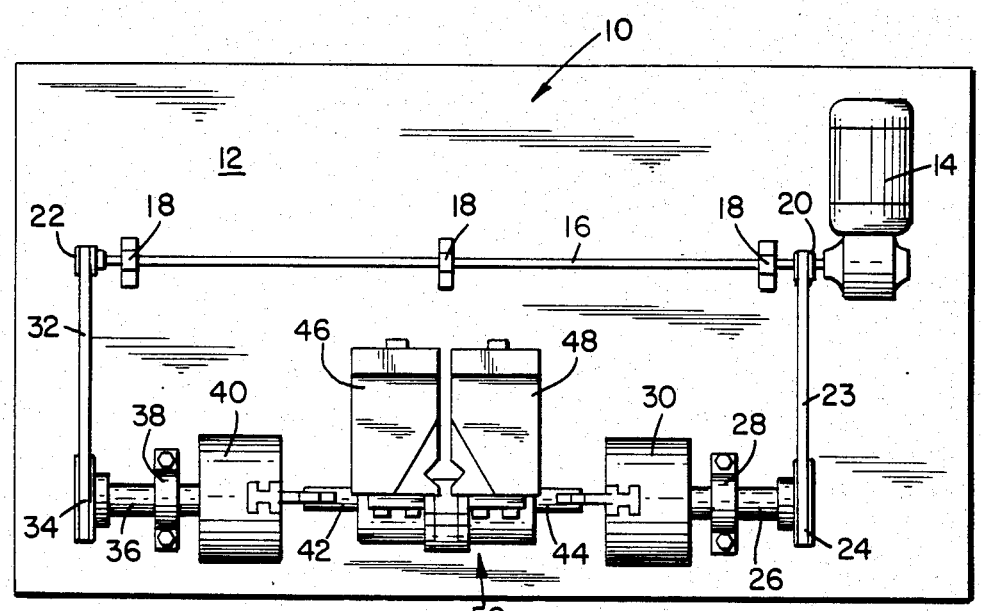
FIG. 1 is a top plan view of a welding station incorporating the gas shielding system of the invention.

Referring now to the Drawings, wherein like reference numerals designate like or corresponding elements throughout the views, and particularly referring to FIG. 1, there is shown a welding station 10 incorporating the gas shielding system of the invention. As illustrated, the welding station 10 comprises an experimental set-up similar to that utilized during development of the invention. The welding station 10 includes a base plate 12 supporting a motor 14 connected to a drive shaft 16 journalled for rotation within bearings 18. A pair of drive pulleys 20 and 22 are secured to the drive shaft 16. The drive pulley 20 is connected to belt 23 to a driven pulley 24 secured to the end of a half-shaft 26 supported for rotation between a pair of bearings 28, only one of which is shown. A chuck 30 is secured to the other end of the half-shaft 26. Similarly, the other driven pulley 22 is connected by a belt 32 to a driven pulley 34 on another half-shaft 36 which is supported for rotation between a pair of bearings 38, only one of which is shown. A chuck 40 is provided on the other end of the half-shaft 36. The opposing half-shafts 26 and 36 are rotatable about a common axis, and the respective chucks 30 and 40 are adapted for driving engagement with elongated workpieces such as sections of tubing, pipe, rods and the like. As illustrated, one section of tube 42 is coupled to the left chuck 40 while another section of tube 44 is coupled to the right chuck 30. A pair of support blocks 46 and 48 are also mounted on the plate 12 for supporting the shielding system 50 of the invention during circumferential welding or heat treatment of the tubes 42 and 44.

As will be explained more fully hereinafter, the shielding system 50 is adapted to enclose the areas of the rotating tubes 42 and 44 adjacent the welding or process zone and flood the space therebetween with inert gas to control undesirable air contamination and thereby achieve better welds of higher reliability. Although the shielding system 50 of the invention will be described herein with particular application to welding, it will be understood that the invention can also be utilized in heat treating or other processes where air contamination is undesirable.

Figure 2:
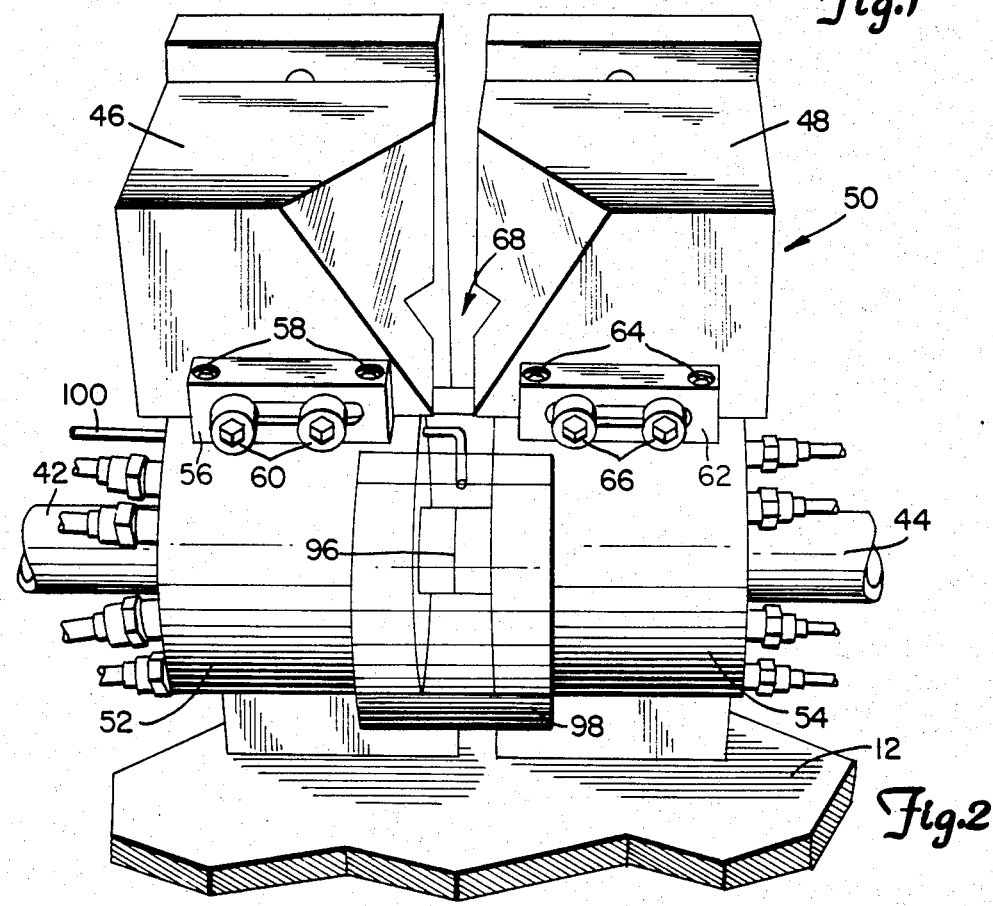
FIG. 2 is an enlarged front perspective view of the shielding system incorporating the invention.

FIG. 2 shows that the shielding system of the invention separated out from the welding station 10 of FIG. 1. It will be seen that the system 50 includes a pair of generally cylindrical bodies or shields 52 and 54 which are located in longitudinally spaced apart relationship around the tubes 42 and 44. Each of the shields 52 and 54 includes a central opening through which tubes 42 and 44 extend in predetermined spaced apart clearance therein. The shields 52 and 54 are similar in construction except that shield 52 is of left hand orientation and shield 54 is of right hand orientation. A slotted lug 56 is secured to the top of the left shield 52 by screws 58, and a second set of screws 60 secure the lug and shield to the associated support block 46. The right hand shield 54 is similarly secured to its associated support block 48 by means of lug 62 and screws 64 and 66. The support blocks 46 and 48 are longitudinally spaced apart to define a generally upright radially extending gap 68 for the welding torch or laser beam (not shown). As will be explained more fully hereinbelow, the shields 52 and 54 of system 50 are spaced apart relative to each other and relative to their respective tubes 42 and 44 to define spaces adjacent to the process zone which are continuously and uniformly flooded with inert gas at positive pressure during welding.

Figure 3:
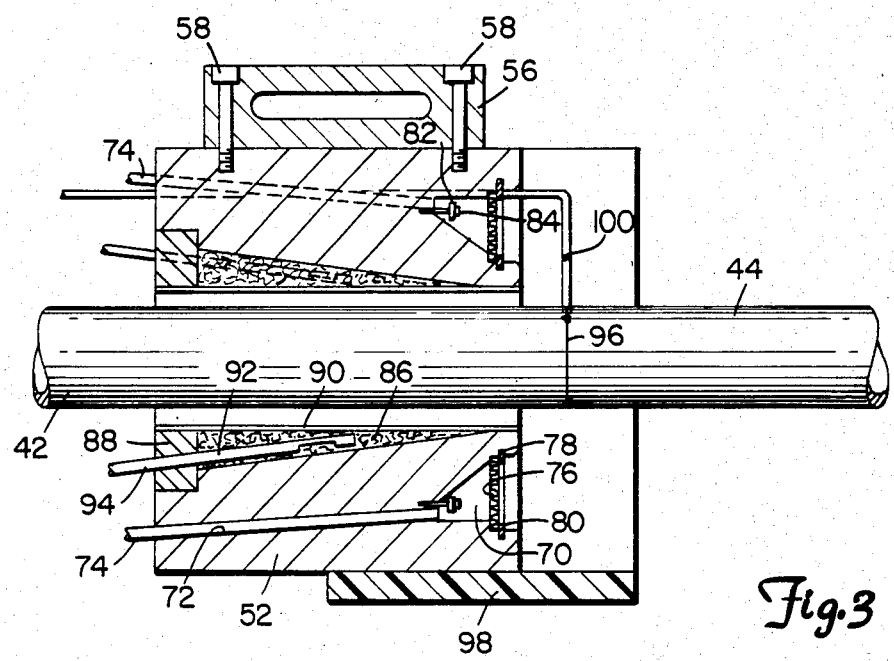
FIG. 3 is a cross-sectional view of one of the shields of the shielding system herein.
Figure 4:
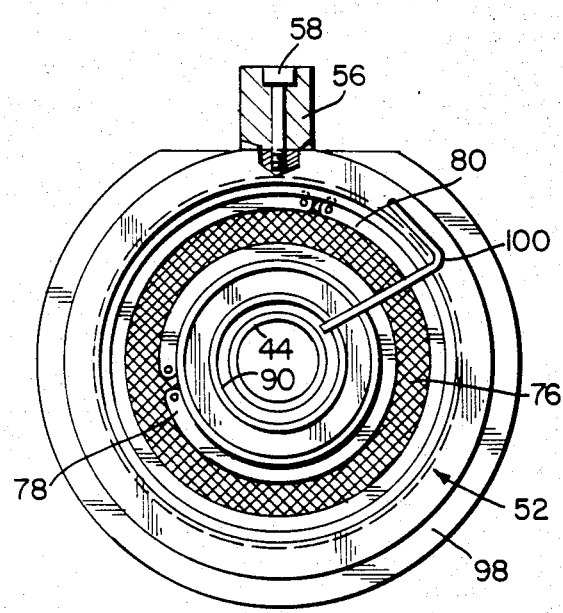
FIG. 4 is an end view of FIG. 3.
Figure 5:
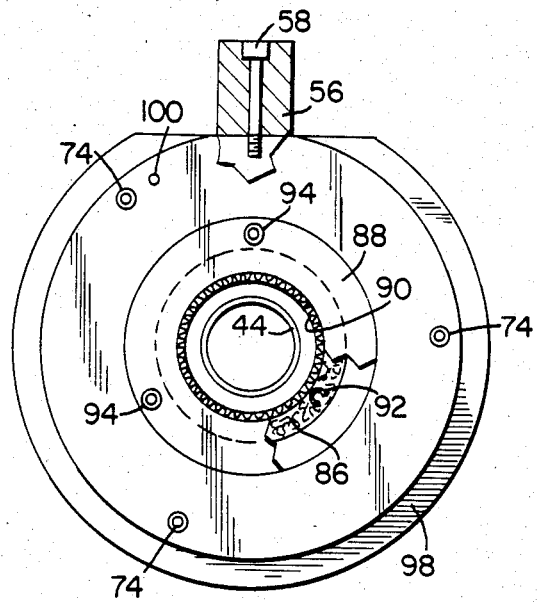
FIG. 5 is an opposite end view of FIG. 3.

FIGS. 3-5 illustrate further constructional details of the shielding system 50. The shields 52 and 54 are symmetrical and therefore only one shield will be described in detail herein, it being understood that the other shield is of opposite orientation but otherwise identical, and that two such symmetrical shields comprise the shielding system 50 herein. The shield 52 comprises a generally cylindrical member which can be machined or otherwise formed from any suitable material, such as stainless steel, to define two annular chambers therein. A first annular chamber 70 is formed in the end of shield 52 adjacent the opposite shield 54. The chamber 70 is connected by inlet conduits 72 to external fittings 74 provided on the opposite end of the shield 52. In accordance with the preferred embodiment, three inlet conduits 72 and fittings 74 are provided at equally spaced intervals about the shield 52 to facilitate even distribution of shielding gas within chamber 70. The inlet conduits 72 and fittings 74 are connected to a source (not shown) of inert gas such as argon.

An annular "gas lens" or diffuser 76 is provided over the outlet side of chamber 70. The diffuser 76 can be of any suitable construction. For example, the diffuser screen 76 can comprise five layers of no. 100 mesh size 304 stainless steel screens. An inside retainer ring 78 and an outside retainer ring 80 snap into corresponding grooves provided about the chamber 70 to secure the diffuser 76 in place. It will therefore be appreciated that the shield 52 includes one chamber 70 having an outlet defined by an annular diffuser 76 adjacent the process zone between shields 52 and 54.

In accordance with the preferred construction, a ring 82 is preferably provided within the first chamber 70 between the multiple inlet conduits 72 and the diffuser screen 76 to further enhance even distribution of gas within the chamber. The ring 82 is secured by screws 84 in position so as to deflect the gas entering the chamber 70 against and adjacent wall, thereby assuring even gas distribution within the chamber.

The shield 52 further includes a second annular chamber 86 formed into the opposite end and inner wall, surrounding the associated tube 42 and extending away from the process zone. As illustrated, the chamber 86 is closed at the outside end by ring 88, while a cylindrical gas lens or diffuser 90 is provided over the outlet side of the chamber. The diffuser 90 can be of any suitable construction. For example, the diffuser 90 can comprise densified porous material such as felt metal of 60% density. The diffuser 90, end ring 88, and shield 52 are welded together. An inlet conduit 92 extends from the chamber 86 to external fittings 94, which in turn are connected to a source (not shown) of inert gas as argon. In accordance with the preferred embodiment, three inlet conduits 92 and fittings 94 are provided at equally spaced intervals about the end of shield 52 to facilitate even distribution of shielding gas within chamber 86.

In accordance with the preferred embodiment, the second chamber 86 is preferably filled with suitable diffuser material, such as fine stainless steel or nickel wool, with the notched outlet ends of the gas conduits 92 being oriented outwardly as is best seen in FIG. 3, to deflect the gas against the adjacent wall of the chamber, in order to further enhance even distribution of gas therein.

Figure 6:
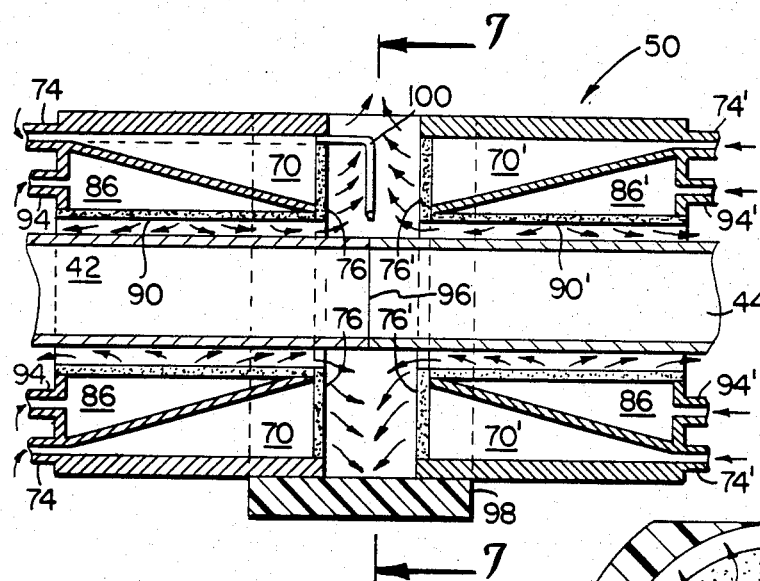
FIG. 6 is a schematic view illustrating operation of the shielding system of the invention.
Figure 7:
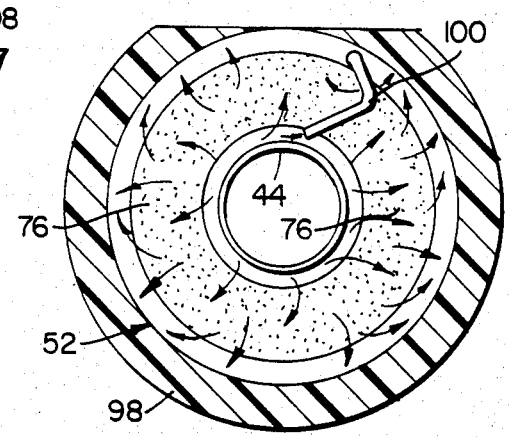
FIG. 7 is a sectional view taken along lines 7—7 of FIG. 6 in the direction of the arrows.

FIGS. 6 and 7 contain schematic illustrations of the shielding system 50 herein, which operates as follows. The shield 54 is symmetrical but otherwise identical in construction to the shield 52 described above. Accordingly, for purposes of clarity, the identical components of shield 54 have been denoted with the same reference numerals utilized in connection with the description of shield 52, but have been differentiated therefrom by means of prime (') notations. Assume that tubes 42 and 44 are positioned end-to-end as shown and that a welding nozzle or laser beam is in place above the space 68 between shields 52 and 54. Also assume that the inlets 74 and 74' of chambers 70 and 70' are connected to a source of inert gas under pressure, and assume that the inlets 94 and 94' of the second chambers 86 and 86' are also connected to a source of inert gas under pressure such that the chambers are positively pressurized and inert gas flows outwardly through diffusers 76, 76', 90 and 90' as indicated by the arrows. Since chambers 86 and 86' are pressurized to a predetermined level above atmosphere, such as about 45 P.S.I., some of the inert gas from these chambers travels outwardly through the annular space along tubes 42 and 44, respectively, while the remainder of the gas from these chambers flows inwardly through this annular space toward the circumferential space or process zone between the shields. Simultaneously, substantially all of the inert gas from chambers 70 and 70' flows into this circumferential space between shields 52 and 54 and radially outward to form a blanket of inert gas surrounding the joint 96 between tubes 42 and 44. As illustrated, the joint 96 comprises a butt joint, however, it will be understood that the shielding system 50 of the invention can be utilized with various other types of joints including overlapping joints, etc.

It will thus be appreciated that a circumferential region surrounding the joint 96, as well as an adjacent annular region extending away from the joint, are continuously flooded with a uniform layer of inert gas flow so that air contamination cannot occur. Any transpiration of air by the rotating tubes 42 and 44 is prevented by the outward flowing inert gas from chambers 86 and 86'. Any aspiration of air as a result of the decompression within the circumferential space between shields 52 and 54 gas therein from chambers 70 and 70', together with any further decompression effects within the circumferential space caused by the application of heat at joint 96, is also countered by the combined flow of inert gases from the two chambers. Welding can thus proceed without air contamination.

In accordance with the preferred embodiment, a longitudinally slotted sleeve 98 is provided over the adjacent ends of shields 52 and 54 in order to approximate a closed circumferential chamber. As is best seen in FIG. 2, the sleeve 98 is slotted or otherwise provided with an access opening for the welding nozzle (not shown). The slotted sleeve 98 can be formed from suitable plastic or aluminum, with substantially transparent plastic being preferred for visibility during the welding operation.

If desired, the shielding system 50 can be provided with an adjustable guiding tube 100 for directing a jet of inlet gas towards the thermally excited region along joint 96. The use of the adjustable guiding tube 100 is partially useful when the shielding system 50 is utilized with a laser welder. The high power density of laser beams causes metals to vaporize, creating "plasma" or "plume" which are highly absorptive to laser beams. Usage of the adjustable guiding tube 100 for blowing away the plasma with a jet of inert gas is therefore desirable. As illustrated, the tube 100 includes a straight elongate portion extending through a longitudinal package in the shield 52, and a generally L-shaped discharge and extending into the circumferential space between shields 52 and 54. The guiding tube 100 can thus be adjusted axially and rotationally to position the discharge end thereof in proper position with respect to joint 96.

It will be appreciated that the shielding system 50 can become hot from proximity to the process zone and heat source. This can be a consideration depending upon the materials involved. If desired, the shielding system 50 can also be provided with heat sinks, fins, or internal coolant passages for cooling purposes.

The merits of the shielding system 50 herein have been experimentally verified. By means of system 50, the oxygen level in the process zone between shields 52 and 54 was consistently lowered from about 200,000 PPM, which is equivalent to the normal oxygen level in air, to about 4.5 to 8 PPM, within 30 seconds of argon purging. It should be noted that 3.5 PPM of oxygen coming out of the argon supply tank was detected. Variations in flow rates through the two chambers of each shield 52 and 54 between about 5 and 40 cubic feet per hour, and variations in the rotational speeds of the tubes being welded up to about 238 rpm, yielded practically identical coverage of inert gas about the process zone. With the slotted sleeve 98, the shielding capability of system 50 was not materially affected by drafts unless deliberately introduced through the slot in the sleeve. Welds made on tubes of Inconel 600 and 690 alloy came out extremely bright and free of oxidation.

From the foregoing, it will thus be apparent that the present invention comprises an improved shielding system for circumferentially welding and heat treating tubes and the like, which system has numerous advantages over the prior art. The primary advantage comprises the fact that the system herein enables better welds of higher quality and reliability to be obtained by substantially complete elimination of air contamination from the welding region. The system herein is of relatively straightforward and compact construction, and can be used with lasers and virtually any other type of welding or heat treating processes with improved interchangability. The system herein facilitates the welding of metal alloy such as titanium and zirconium, which are particularly sensitive to air contamination during welding. Other advantages will be evident to those skilled in the art.

Although the particular embodiment of the invention has been illustrated in the accompanying Drawings and described in the foregoing Detailed Description, it will be understood that the invention is not limited to the embodiments disclosed, but is intended to embrace any alternatives, equivalents, modifications and/or rearrangements falling within the scope of the invention as defined by the following claims.

I claim:

1. Apparatus for gas-shielding a circumferential process zone about an elongate workpiece during welding or heat treating, comprising:

means defining a first chamber having at least one inlet adapted for connection to a source of inert gas, and an annular outlet surrounding said workpiece adjacent the process zone;

first gas diffuser means mounted over the outlet of said first chamber for facilitating even flow of inert gas into the zone;

means defining a second chamber having at least one inlet adapted for connection to a source of inert gas, and a cylindrical outlet surrounding said workpiece in predetermined spaced relationship therewith and extending away from the process zone; and second gas diffuser means mounted over the outlet of said second chamber for facilitating even flow of gas along the workpiece.

2. The apparatus of claim 1, wherein said first and second chambers are formed in a common, generally cylindrical body.

3. The apparatus of claim 1, wherein said first gas diffuser means comprises at least one layer of metal screen or predetermined mesh size.

4. The apparatus of claim 1, wherein said second gas diffuser means comprises at least one layer of metal porous material of predetermined porosity.

5. The apparatus of claim 1, further including:
means positioned within said first chamber for deflecting gas entering via the inlet to facilitate uniform gas distribution within said chamber.

6. The apparatus of claim 1, further including:
porous means substantially entirely filling said second chamber to facilitate uniform gas distribution therein.

7. Apparatus for gas shielding a circumferential process zone about an elongate workpiece during welding or heat treating, which comprises:

a generally cylindrical shield adapted to surround the workpiece in predetermined spaced apart relationship adjacent one side of the process zone;

said shield including a first chamber having an inlet adapted for connection to source of shielding gas(es), and an annular outlet adjacent to the process zone;

said shield further including a second chamber having an inlet adapted for connection to a source of shielding gas, and a cylindrical outlet surrounding the workpiece and extending away from the process zone;

first and second diffusers mounted over the outlets of the first and second chambers, respectively, in each shield to effect even distribution of shielding gas into the process zone and between said shield and workpiece; and deflector means positioned within the first chamber of said shield for facilitating uniform distribution of gas entering via the inlet thereof.

8. The apparatus of claim 7, wherein a plurality of inlets are provided for the first chamber of each shield, and wherein a plurality of inlets are provided for the second chamber of each shield, with all of said inlets being located at circumferentially spaced apart intervals.

9. The apparatus of claim 7, further including:
a slotted sleeve extending between said shields;
porous means substantially entirely filling the second chamber to facilitate uniform gas distribution therein.

10. The apparatus according to claim 9, wherein said porous means comprises metal wool.

11. The apparatus of claim 7, wherein said first diffuser comprises at least one layer of metal screen of predetermined mesh size.

12. A system for gas shielding a circumferential process zone about an elongate workpiece during welding or heat treating, which comprises:

a pair of generally cylindrical shields arranged in longitudinally spaced apart relationship on opposite sides of the process zone, and adapted to surround the workpiece in predetermined spaced apart relationship;

each shield including a first chamber having a plurality of inlets, adapted for connection to source of shielding gas, and a single annular outlet adjacent to the process zone;

shield further including a second chamber having a plurality of inlets adapted for connection to a source of shielding gas, and a single cylindrical outlet surrounding the workpiece and extending away from the process zone;

first and second diffusers mounted over the outlets of the first and second chambers, respectively, in each shield to effect even distribution of shielding gas into the process zone between said shields and workpiece; and deflector means positioned within the first chamber of said shield for facilitating uniform distribution of gas entering via the inlets thereof.

13. The system of claim 12, further including:
porous means substantially entirely filling the second chamber of each shield, and wherein a plurality of inlets are provided for the second chamber of each shield, with all of said inlets located at circumferentially spaced apart intervals.

14. The system according to claim 13, wherein said porous means comprises metal wool selected from the group consisting of stainless steel wool or nickel wool.

15. The system of claim 12, wherein said first diffuser of each shield comprises a plurality of layers of stainless steel screen of predetermined mesh size.

16. The system of claim 12, further including:
a slotted sleeve extending between said shields to substantially enclose the process zone therebetween.

17. The system of claim 12, further including:
a guide tube slideably extending through one of said shields for directing inert gas into the process zone and across the workpiece.

* * * * *